350-314
6/5/79 XR 4,157,215 SR

United States Patent [19]
Hanak

[11] 4,157,215
[45] Jun. 5, 1979

[54] PHOTODEPOSITION OF CRT SCREEN STRUCTURES USING CERMET IC FILTER

[75] Inventor: Joseph J. Hanak, Lawrenceville, N.J.

[73] Assignee: RCA Corporation, New York, N.Y.

[21] Appl. No.: 899,247

[22] Filed: Apr. 24, 1978

[51] Int. Cl.² .......... G03B 41/00
[52] U.S. Cl. .......... 354/1; 96/36.1; 350/314
[58] Field of Search .......... 354/1; 350/311, 314, 350/164; 252/300; 428/432; 96/36.1

[56] References Cited

U.S. PATENT DOCUMENTS

| | | | |
|---|---|---|---|
| 3,582,326 | 6/1971 | Smithgall | 96/27 R |
| 3,582,701 | 6/1971 | Zeliotis | 96/36.1 UX |
| 3,592,112 | 7/1971 | Frey | 354/1 |
| 3,667,355 | 6/1972 | Ng et al. | 354/1 |
| 3,982,252 | 9/1976 | Yamazaki et al. | 354/1 |

OTHER PUBLICATIONS

Zeller, H. R., et al., "Optical Properties . . . Films", *J. Appl. Phys.*, 44(6), Jun., 1973, pp. 2763-2764.
Tokarsky, R. W., et al., "Potential Uses . . . Films", *J. Vac. Sci. Technol.*, 12(2), Mar./Apr. 1975, pp. 643-645.

*Primary Examiner*—John Gonzales
*Attorney, Agent, or Firm*—E. M. Whitacre; G. H. Bruestle; L. Greenspan

[57] ABSTRACT

Method of making a CRT screen structure includes projecting a light field through an IC filter having a tailored light transmission, through a photographic master, and incident upon a photosensitive layer. The IC filter, which adjusts the light intensity across the field, comprises a cermet layer constituted of inorganic light-absorbing metal particles in an inorganic light-transmitting medium; for example, a nickel-silica cermet.

10 Claims, 3 Drawing Figures

PHOTODEPOSITION OF CRT SCREEN STRUCTURES USING CERMET IC FILTER

BACKGROUND OF THE INVENTION

This invention relates to an improved photographic method for making screen structure for a cathode-ray tube (CRT).

It is known to make a screen structure, such as a black, light-absorbing matrix, or a luminescent layer, by a photographic method. The use of an IC filter with a tailored light transmission to adjust the light intensity across a projected light field in such method is also known. Such intensity-correction (IC) filters have been made of custom-ground glass, of a layer of vapor-deposited metal particles, of a layer of silver particles in gelatin, or of a layer of carbon particles in gelatin, as disclosed for example in U.S. Pat. Nos. 3,420,150 to S. H. Kaplan, 3,982,252 to E. Yamazaki et al., 3,582,326 to H. E. Smithgall and 3,592,112 to H. R. Frey respectively.

While each of these prior types of IC filters is useful, nevertheless they are difficult and relatively expensive to reproduce reliably, thus adding to the cost of equipping a manufacturing facility. The latter three types are comprised of a layer of opaque particles in varying densities and/or varying layer thicknesses. When the particles are relatively large and/or the layers are relatively thick, the filter produces an undesirable amount of light scattering, degrading the quality of the screen structure being made. Light scattering can also be caused by scratches, pinholes, bubbles and other defects in or on the layer. The latter two types, which use organic binders, are somewhat easier and cheaper to reproduce reliably than the former two types, but nevertheless frequently have pinholes, bubbles and such light-scattering defects. Also, the latter two types have poor abrasion resistance and are easily damaged with normal handling in the CRT factory.

Light filters with substantially uniform light transmission and made of a cermet layer are also known, as disclosed in H. R. Zeller et al., *J. Applied Physics* 44 (1973) 2763–2764; and R. W. Tokarsky et al, *J. Vacuum Science Technology* 12 (1975) 643–645. The cermet layer comprises opaque inorganic metal particles in a transparent inorganic medium. Such cermet layers may be made by vaporizing, as by evaporating or sputtering, the desired materials and then depositing the vaporized materials on a support surface. Such cermet layers are intended to have a substantially uniform light transmission across their surfaces. If the light transmission is nonuniform, it is not by design, not tailored for a particular purpose and, therefore, not easily and reliably reproducible. Such cermet layers can be made with very small-sized particles in very thin, dense, smooth-surface layers that are relatively free of fabrication defects, are resistant to damage by abrasion, and exhibit relatively low light scattering.

SUMMARY OF THE INVENTION

In common with prior methods, the novel method projects a light field through an IC filter, through a photographic master and incident upon a photosensitive layer. In the novel method, the IC filter comprises a cermet layer constituted of inorganic light-absorbing metal particles in an inorganic light-transmitting medium. The particles are nonuniformly distributed in the medium in such a predetermined manner as to provide the desired tailored light transmission through the layer.

The use, in the defined method, of a cermet IC filter with tailored light transmission has several advantages over prior methods for one or more of the following reasons. First, the filter is more easily and more reliably reproducible for use in the novel method than any of the prior types of filters. Second, the light transmission across the filter may be smoothly graded in a predetermined manner over a very wide range of transmissions. Third, the filter is very resistant to abrasion and may be washed with soap and water, thereby being very resistant to damage in handling. Fourth, the filter may cause less scattering of light from the light field that is projected therethrough due to the use of much smaller particles, thinner layers and smoother surfaces than prior IC filters. Also, the IC filter may include an antireflection coating on the cermet layer. As a result, the novel method is improved over prior methods in its efficiency and in the quality of the product produced.

DETAILED DESCRIPTION OF THE PREFERRED EMBODIMENTS

Figure 1:
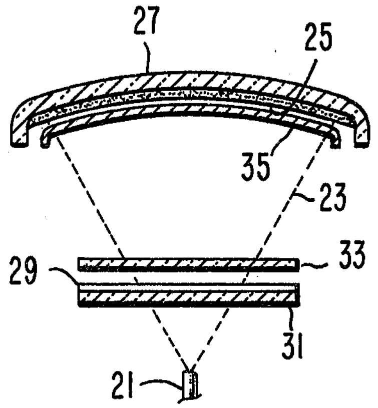
FIG. 1 is a schematic sectional view of an exposure lighthouse employing the novel method.

The novel method comprises projecting a light field through an intensity-correction (IC) filter and a photographic master incident upon a photosensitive layer. The IC filter comprises a cermet layer constituted of inorganic light-absorbing metal particles in an inorganic light-transmitting medium. This method is illustrated schematically in FIG. 1, which includes a light source 21 which projects a light field 23 towards a light-sensitive layer 25 supported on the inner surface of a faceplate panel 27 of a CRT. The light field 23 passes through an IC filter 29 which is a cermet layer carried on a clear glass support 31, and through a correction lens 33 which is an optical refractor, and through a photographic master 35 which , in this case, is an apertured mask mounted in the panel 27. Except for the IC filter, the novel method and equipment for practicing the novel method are adequately described elsewhere in the patent literature; for example, in the first four of the above-cited patents, so a detailed description herein is unnecessary. For the purposes of exemplifying the novel method, the exposure lighthouse described in U.S. Pat. No. 3,592,112 to H. R. Frey is used in the preferred embodiment. However, many variations can be made in that lighthouse other than changing the IC filter without departing from the spirit of the novel method. For example, as is known in the art, other light sources, lenses, and photosensitive layers can be used.

The IC filter employed in the novel method comprises a thin cermet layer having a tailored light transmission. The tailoring is achieved by local variation of thickness and/or composition in the cermet layer. Such layers can now be made economically by radio-frequency (rf) cosputtering, although other methods can be used to make such layers. Such cermet layers have other important virtues. Optically, they exhibit low reflectance and low scattering of the incident light; and they exhibit similar spectral responses to all visible and near ultraviolet wavelengths. Mechanically, they are adherent to optical glass substrates and are chemically-stable, durable, scratch-resistant and washable in aqueous solutions. In addition, they can be fabricated economically with complex, tailored nonsymmetrical transmission profiles. The combination of these characteristics makes their use in methods for printing screen structures for CRTs not only desirable but nonobvious.

With some modification to prior fabrication methods, the IC filters employed in the novel method can be designed and fabricated by known technology. It is known that the relationship between the incident and transmitted light intensities $I_o$ and I respectively for a filter layer at a given wavelength is given by $$I=I_o e^{-\alpha d} \quad (1)$$

where d is the thickness and $\alpha$ is the extinction coefficient of the layer. For a cermet layer at constant temperature and wavelength, $\alpha$ is a function of the metal content in the cermet ($X_M$), the dielectric constants of the metal ($\epsilon_M$), of the dielectric ($\epsilon_D$) and of the cermet ($\epsilon_C$):

$$\alpha=f(X_M,\epsilon_M,\epsilon_D,\epsilon_C). \quad (2)$$

The extinction coefficient increases approximately linearly with the metal content in the layer. [1] The transmission, defined as $$T=I/I_o=\epsilon^{-\alpha d}, \quad (3)$$

therefore decreases exponentially with increasing film thickness at a constant film composition and also decreases exponentially with increasing metal content at a constant film thickness. This kind of variation can be used to advantage in the design and fabrication of cermet IC filters.

Cermets in the form of layers or films can be prepared most readily by rf cosputtering, as is known in the cermet art [2]. In this method, a disc target of one of the materials, e.g. silica, is plated on the target electrode (the cathode), and one or more pieces of other target material or materials (nickel metal, in the present case) are placed on the surface of the target disc. A substrate, such as a glass disc, is placed opposite and parallel to the target, about 3 to 8 cm away. The target and substrate are contained in a vacuum chamber, which after evacuation is back filled with an inert gas, such as argon, to a pressure of 1 to 15 millitorr. Gas discharge is then started by imposing an rf field of several hundred to a few thousand volts RMS between the target and the ground. The ions in the gas discharge dislodge silica and nickel molecules and atoms from the target, which redeposit as a mixture in the form of a cermet layer on the surface of the substrate. The composition of the deposited layer depends on the geometry of the target arrangement, the relative positions of the target and the substrate and the relative sputtering rates. The thickness of the layer for a given sputtering geometry depends on the rf power and the sputtering time. Methods have been developed earlier for computing the composition and thickness [2,3,4] of the layer at any point on the substrate. Thse parameters can be used in turn to calculate the expected light transmission of the layer on any point of the substrate by means of equations (2) and (3), and the transmission can be plotted in the form of contours as a function of the substrate coordinates.

The method described above amounts to a modelling of the transmission of a desired IC filter. One may proceed as follows: The light intensity distribution in the lighthouse is first measured at selected points at the plane of the filter without any filter present. The light intensity profile is then converted to a desired light transmission profile. A transmission profile for producing a uniform light field from a nonuniform light field may be obtained by dividing the measured light intensities into a constant desired light intensity which is somewhat lower (say by 20%) than the highest measured light intensity at each point. Where some other profile is desired, the profile is obtained, point by point, by dividing the measured intensity by a constant large fraction of the desired intensity. Next, a sputtering target arrangement is chosen which is likely to approximate the desired transmittance profile. The cermet composition and thickness are calculated, as well as the corresponding transmission profile. Iteration of this process yields the desired sputtering target arrangement. An IC filter is prepared by sputtering with this target arrangement. The transmission profile of the resulting IC filter is measured and compared with the desired profile. If necessary, the sputtering conditions and/or the sputtering target arrangement are modified as required and an IC filter with the desired transmission profile is produced.

A very useful method of changing the IC filter characteristics is achieved by retaining a given sputtering target arrangement and varying the sputtering time. This procedure will change the film thickness d everywhere by the same percentage. The transmission changes exponentially with the thickness (see equation (3)); however, since the extinction coefficient $\alpha$ varies with composition, the changes in transmission are amplified. Hence, relatively small changes in the sputtering time can result in considerable changes in the light transmission profile.

The cermet layer is constituted of light-absorbing metal particles in a light-transmitting medium. The medium should be highly transparent in the desired wavelength region. The light-absorbing metal should be chosen to result in a cermet that has a relatively flat spectral response in the desired wavelength region. Both the transmitting medium and the absorbing particles should be chemically stable with respect to the ambient atmosphere and conditions of use of the cermet layer. For the visible light range, metals such as Ti, Zr, HF, V, Nb, Ta, Cr, Mo, W, Co, Ni, Ru, Rh, Pd, Re, Os, Ir and Pt are suitable as light absorbers. Dielectrics, such as $SiO_2$, $Al_2O_3$, MgO, $Y_2O_3$, $TiO_2$, borosilicate glass and the like, are useful as light-transmitting media.

The ideal composition of the cermet layers in IC filters used in the novel method should range between about 4 and 50 volume percent of metal particles and the balance light-transmitting medium. The metal content should not exceed fifty percent, chiefly because, at higher concentrations, the light transmission profile cannot be readily calculated from the theory. Also, the light reflectance of the layer increases with increasing metal content, which is not desirable. And, the metal particle sizes increase with increasing metal content, which is not desirable from the standpoint of light scattering. Although there is no lower limit for the metal concentration in the cermet, in practice, concentrations below about 4% have very high transmissions and would be rarely used in optical filters. It is preferred that nickel-silica cermet layers consist essentially of 4 to 20 volume percent nickel and the balance silica.

The sizes of the metal particles used in cermet IC filters depend on the metal used and the composition of the layer. Soft metals, such as lead, tin, silver and gold, which do not readily react with the atmosphere, tend to form large metal particles and hence are not preferred. Refractory metals tend to have smaller particles in the cermets. Generally, the particle size increases with metal content. In a nickel-silica cermet layer, the average particle sizes range from 10 to 40 Å over the composition range of 4 to 50 volume percent nickel. These sizes are a small fraction of the wavelength of the ultraviolet light used in the lighthouse and hence do not contribute to light-scattering in a significant way.

The cermet layer thicknesses used in the filters ranged typically from 400 to 2100 Å. For most needs, 2000 Å would be about the maximum necessary thickness. It is preferable that the layers are thin for several reasons. One is that thin cermet layers are smoother than thick ones and for this reason scatter less light. Also, thin cermet layers build up less stress and therefore have less of a tendency to peeling. And, there is less tendency to variation of transmission due to interference with thin layers.

Figure 2:
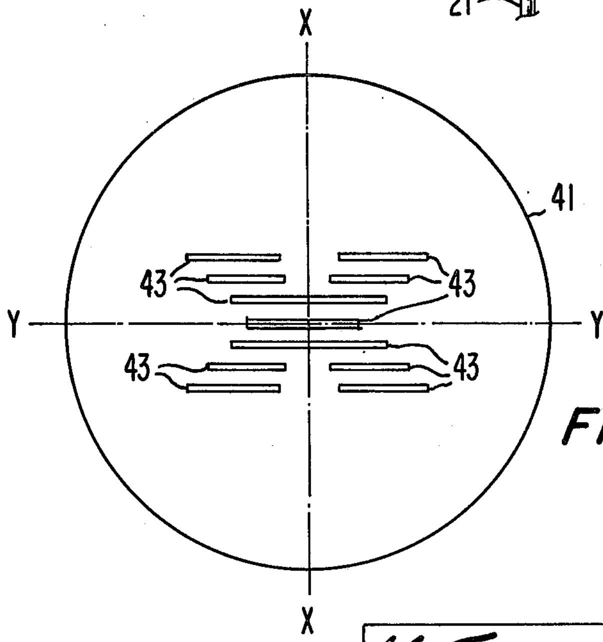
FIG. 2 is a plan view of a cosputtering target for preparing a $Ni_x(SiO_2)_{1-x}$ cermet IC filter.
Figure 3:
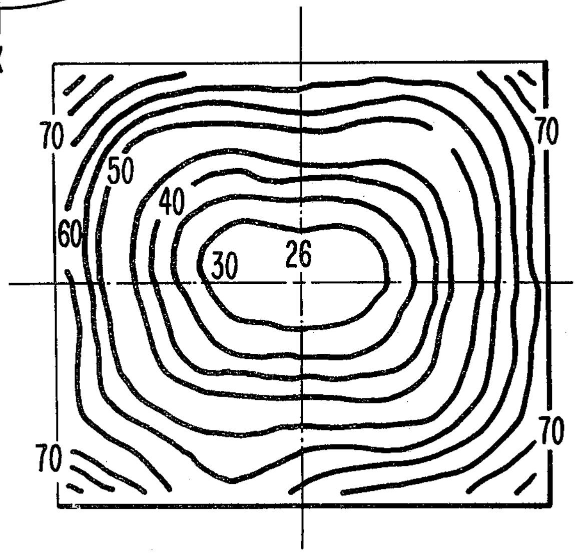
FIG. 3 is a graph showing the transmission profile of an IC filter prepared according to an example herein.

In an example of the procedure for depositing a nickel-silica cermet layer with tailored light transmission, the target arrangement shown in FIG. 2 is used. The arrangement consists of a disc target 41 of fused $SiO_2$ about 33 cm in diameter and 0.32 cm thick, silvered on the back side for good contact to the electrode. Eleven strips 43 of nickel metal about 0.05 cm thick, 0.4 cm wide and having several different lengths are arranged as shown symmetrically about the x and y axes. The substrate used in a plate glass disc about 26.7 cm in diameter and 0.32 cm thick, centered with the target and about 5.3 cm above it. The sputtering gas is argon at a pressure of about 5 millitorr. Sputtering rf power of about 200 watts is used at a frequency of about 13.56 megahertz. The sputtering time is about 36 minutes. The measured light transmission profile in percent using white light is shown in FIG. 3. The cermet layer produced is adherent to the glass substrate, scratch resistant to a razor blade, and washable in soap and water. The cermet layer, which is an IC filter, shows no change in transmission upon storage in air for at least 2½ months. The grading or variation of light transmission with position is smooth and continuous. Light scattering, a very important parameter in the case of focused light, is so small that it could not be measured.

Two tricolor CRT screens were made by the novel method using cermet IC filters, and another two tricolor CRT screens were made by a similar method using gelatin-carbon filters for comparison. The TABLE shows the percent cross contamination in the different color fields of each screen. Cross contamination is a measure of the amount of stray light in the lighthouse.

TABLE

| Filter/Tube | Percent Cross-Contamination | | |
|---|---|---|---|
| | Red on Green | Blue on Green | Red on Blue |
| Cermet/#1 | 1.3 | 2.3 | 4.7 |
| Cermet/#2 | 0.8 | 2.4 | 4.4 |
| Gel-Carbon/#1 | 1.6 | 2.5 | 4.6 |
| Gel-Carbon/#2 | 1.5 | 2.7 | 5.4 |

On the average, reductions in cross contamination in all three fields have been realized with the novel method using cermet IC filters. Viewing screens of color TV picture tubes made by the novel method using these filters in the apparatus shown in FIG. 1 showed improved color purity as compared to those made by a similar method using carbon-particle IC filters of the prior art.

The fabrication of duplicate cermet filters is simple; once an appropriate target arrangement has been established, the substrates have to be merely fed in to the coating apparatus, coated and then taken out. Minor modifications to the transmission profiles of subsequent filters can be made by repositioning and/or resizing the pieces of target material on the target disc. In order to insure uniformity from filter to filter, it may be appropriate to incorporate a light source and a photocell in the sputtering system to monitor the thickness of the deposit rather than to rely solely on sputtering time.

An antireflection (AR) coating may be deposited on the cermet layer. In the range of cermet composition from 4 to 25 volume percent nickel in silica, the measured refractive index ranged from 1.8 to 2.14. The antireflection coating suitable for the cermet is $SiO_2$. A one-quarter wavelength AR film of $SiO_2$ was vapor-deposited on part of a cermet layer produced according to the example. The reflectivity decrease was plainly observable by eye. The central transmission for the AR coated filter increased from 0.147 to 0.167 after depositing the AR coating.

The glass side of the filter was also coated with an AR coating. For glass, the appropriate AR coating is $MgF_2$ (magnesium fluoride). After vapor depositing a one-quarter wavelength coating on the glass, the transmission increased from 0.184 to 0.194. Thus, coating both sides with appropriate AR coatings increases light transmission measurably and also reduces the reflection and scattering of light significantly. References:

[1] B. Abeles, *Applied Solid State Science* 6 (1976) 94–102.
[2] J. J. Hanak. *J. Materials Science* 5 (1970) 964.
[3] J. J. Hanak et al., *J. Appl. Phys.* 43 (1972) 1666.
[4] J. J. Hanak et al., *J. Appl. Phys.* 44 (1973) 5142.
[5] J. I. Gittleman, U.S. Pat. No. 3,843,420.

What is claimed is:

1. In a photographic method for printing a screen structure for a cathode-ray tube including projecting a light field (a) through a light-transmission filter comprising inorganic light-absorbing particles, said filter having tailored variations in light transmission for producing predetermined variations in light intensity in said light field, (b) through a photographic master, and (c) incident upon a photosensitive layer, the improvement wherein said filter comprises a cermet layer constituted of inorganic light-absorbing metal particles nonuniformly distributed in an inorganic light-transmitting medium in predetermined manner to provide said tailored variations in light transmission.

2. The method defined in claim 1 wherein the average dimension of said particles is in the range of about 10 to 40 Å.

3. The method defined in claim 1 wherein said particles are of a nickel metal.

4. The method defined in claim 1 wherein said particles are of a metal selected from the group consisting of Ti, Zr, Hf, V, Nb, Ag, Ta, Cr, Mo, W, Co, Ni, Ru, Rh, Pd, Re, Os, Ir and Pt.

5. The method defined in claim 1 wherein said medium is a dielectric selected from the group consisting of $SiO_2$, $Al_2O_3$, MgO, $Y_2O_3$, $TiO_2$, glass, ZnS, $MgF_2$ and $CaF_2$.

6. The method defined in claim 1 wherein said particles are of nickel metal and said medium is of $SiO_2$.

7. The method defined in claim 1 wherein said cermet layer has a thickness between about 400 and 2100 Å.

8. The method defined in claim 1 wherein said cermet layer consists essentially of 4 to 50 volume percent metal particles and the balance of said inorganic medium.

9. The method defined in claim 1 wherein said cermet layer consists essentially of nickel-silica cermet containing between 4 and 20 volume percent nickel and the balance silica.

10. The method defined in claim 1 wherein said filter comprises a reflection-reducing coating in combination with said cermet layer.

* * * * *